United States Patent [19]
Ishihara

[11] Patent Number: 5,684,792
[45] Date of Patent: Nov. 4, 1997

[54] ECHO CANCELLER SYSTEM IN AN ATM NETWORK

[75] Inventor: Teruo Ishihara, Kawasaki, Japan

[73] Assignee: Fujitsu Limited, Kanagawa, Japan

[21] Appl. No.: 496,212

[22] Filed: Jun. 28, 1995

[30] Foreign Application Priority Data

Oct. 20, 1994 [JP] Japan ................ 6-255590

[51] Int. Cl.$^6$ ................ H04B 3/20; H04L 12/28
[52] U.S. Cl. ................ 370/286; 370/282; 379/406; 379/410
[58] Field of Search ................ 370/32.1, 60.1, 370/286, 352, 395, 399, 282; 379/410, 411, 406; 375/650, 231, 222; 365/154; 348/607

[56] References Cited

U.S. PATENT DOCUMENTS

| | | | |
|---|---|---|---|
| 4,803,648 | 2/1989 | Dierckx et al. | 379/411 |
| 4,868,874 | 9/1989 | Takatori et al. | 379/411 |
| 5,457,684 | 10/1995 | Bharucha et al. | 370/60.1 |

FOREIGN PATENT DOCUMENTS

| | | |
|---|---|---|
| 4-349735 | 12/1992 | Japan . |
| 5-244248 | 9/1993 | Japan . |

*Primary Examiner*—Wellington Chin
*Assistant Examiner*—Melissa Kay Carman
*Attorney, Agent, or Firm*—Helfgott & Karas, P.C.

[57] ABSTRACT

An echo canceller system for performing echo cancelling processing on a plurality of cells on a transmission line includes a plurality of echo canceller units to which the cells applied to the echo canceller system are allocated according to an applied order of the cells regardless of channels of the cells.

22 Claims, 14 Drawing Sheets

| EC-LSI | T0 | T1 | T2 | T3 |
|---|---|---|---|---|
| A-group | D[0]-D[127] | D[128]-D[255] | D[256]-D[383] | D[384]-D[511] |
| B-group | D[128]-D[255] | D[256]-D[383] | D[384]-D[511] | D[0]-D[127] |
| C-group | D[256]-D[383] | D[384]-D[511] | D[0]-D[127] | D[128]-D[255] |
| D-group | D[384]-D[511] | D[0]-D[127] | D[128]-D[255] | D[256]-D[383] |

| DSP | T0 | T1 | T2 | T3 |
|---|---|---|---|---|
| A-group | M[0]-M[63] | M[64]-M[127] | M[128]-M[191] | M[192]-M[255] |
| B-group | M[64]-M[127] | M[128]-M[191] | M[192]-M[255] | M[0]-M[63] |
| C-group | M[128]-M[191] | M[192]-M[255] | M[0]-M[63] | M[64]-M[127] |
| D-group | M[192]-M[255] | M[0]-M[63] | M[64]-M[127] | M[128]-M[191] |

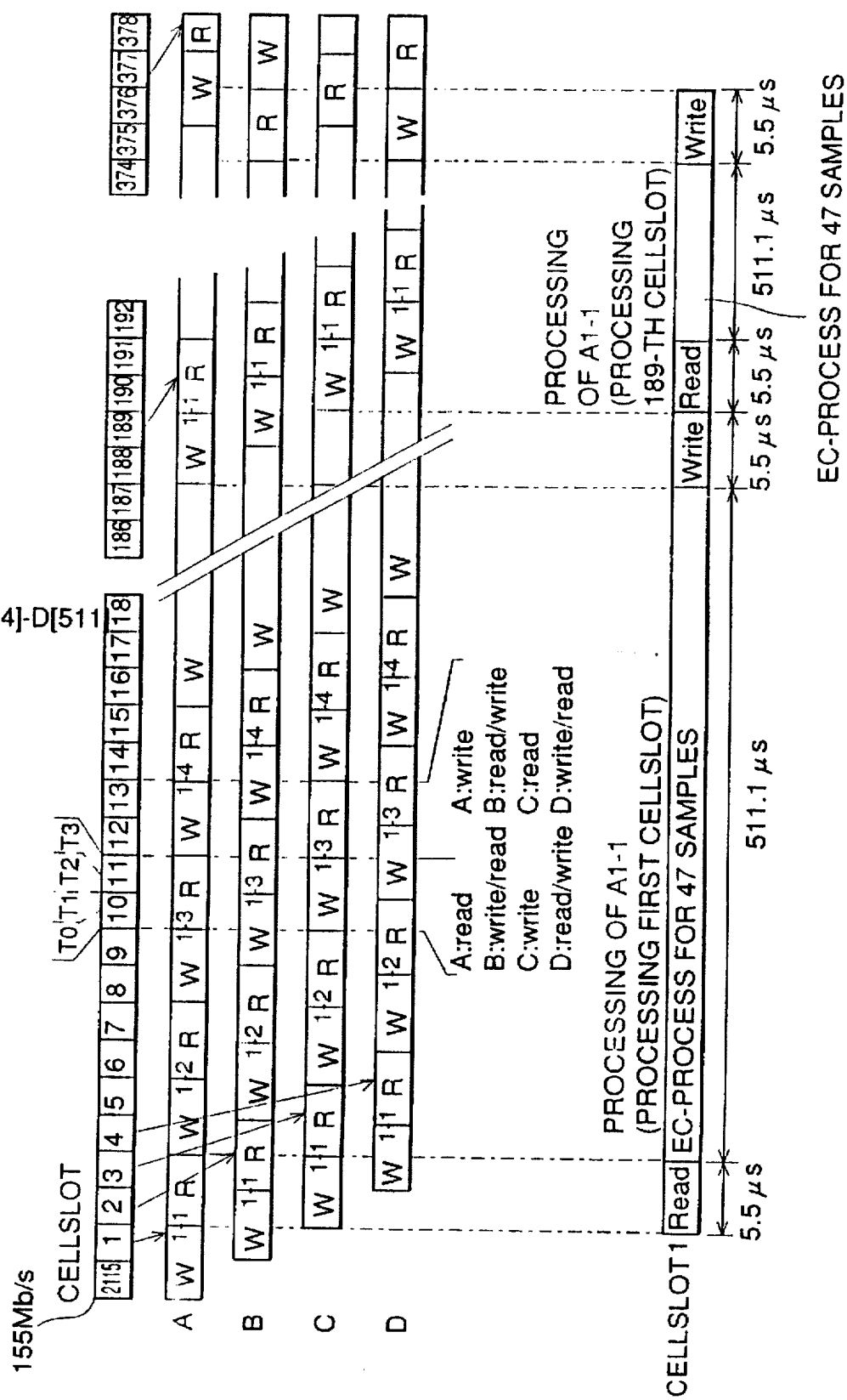

ECHO CANCELLER SYSTEM IN AN ATM NETWORK

BACKGROUND OF THE INVENTION

1. Field of the Invention

The present invention generally relates to an echo canceller system in an asynchronous transfer mode (ATM) network.

Recently, to present high-speed and broadband communications such as high-speed data transmission, image communications, and multimedia communications, the ATM technologies are studied and developed to realize a broadband integrated services digital network (B-ISDN).

B-ISDN includes networks based on 64 kbps such as telephone systems and a narrow-band ISDN (N-ISDN). When integrating the 64-kbps networks (synchronous transfer mode networks: STM networks) such as telephone systems into the ATM network, a transmission delay may increase because of a delay for converting to a cell format and a delay for absorbing fluctuation. It is supposed that an echo generated in a 2-wire/4-wire communication system accommodating an analog telephone system will affect an opinion quality.

To suppress affection of the echo occurring in speech communications, the echo canceller is widely used. As the ATM networks are being constructed over a wide area, regions necessary for the echo canceller are also extended. This present invention is directed to the echo canceller system used in the ATM networks.

2. Description of the Prior Art

Conventional echo cancellers have been used in the STM network. In the conventional echo canceller, processing is carried out for each channel, and transmission data transmitted at a 64-kbps speed is applied to the echo canceller at an exact time interval. Therefore, the conventional echo canceller is operable by sampling the data at 8 kbps and processing the sampled data at a 125-μsec interval (8 kHz).

FIG. 1 shows an application example of the conventional echo cancellers in the STM networks. In FIG. 1, an analog telephone "a" communicates with an analog telephone "b" through STM networks 81, 83, 85, echo cancellers (EC) 82, 84 and 2-wire/4-wire converter hybrids (H) 80, 86. In this communication, when a far-end speaker signal α from the telephone b is transmitted to the telephone "a" of a near-end speaker through the hybrid 80, an impedance mismatch causes an echo α' which is transmitted to the telephone "b" of the far-end speaker. If a distance between the telephones "a" and "b" is so long and it takes a delay time more than a given time to pass the distance, the echo α' affects telephone voice quality received by the far-end speaker. Therefore, to suppress the affection of the echo α', EC 82 is located between the STM networks 81 and 83. In the same way, EC 84 cancels an echo β' occurring in the hybrid 86 from a transmitted signal β from the telephone "a".

In the STM networks, all analog speech signals are sampled at the 125-μsec interval (8 kHz) to be converted to PCM codes (1 byte: 8 bits), each of the PCM codes having a 64-kbps speed. The PCM code is transmitted on an allocated channel at a fixed time interval. Accordingly, operations of the conventional echo cancellers 82, 84 in the STM networks can be carried out by processing 64-kbps input data generated at the exact 125-μsec interval each 125-μsec (8 kHz).

FIG. 2 shows a block diagram of a configuration of the conventional echo canceller. The echo canceller shown in FIG. 2 corresponds to EC 82 shown in FIG. 1.

The echo canceller shown in FIG. 2 belongs to a conventional finite impulse response (FIR) filter. In the echo canceller, when an incoming signal from the far-end speaker is applied to a receive-side input A, the incoming signal is input to a tap memory 824. A quasi-echo generator 823 calculates an impulse response of an echo pass (a pass from the receive-side input A to a transmit-side input D through a hybrid H) by using the data stored in a tap-coefficient memory 822 and the tap memory 824, and generates a quasi-echo $y_t'$. The quasi-echo $y_t'$ is subtracted from an echo signal $y_t$ applied from the transmit-side input D in an adder 820.

A remaining echo ($y_t-y_t'$) produced from the adder 820 is transmitted as a transmit output and is applied to a tap-coefficient updating section 821. The tap-coefficient updating section 821 updates tap coefficients by using the tap memory 824, and based on the result, updates a content of the tap-coefficient memory 822. In this echo canceller, an echo cancelling process can be carried out for one sample (8-bit PCM codes) applied at the 125-μsec interval.

On the other hand, in the ATM networks, one ATM cell is constructed with 53 bytes, the top 5-bytes of which are an ATM header, and the following 48-bytes are an information field. When the information field is speech information, one byte of the 48-byte information field is an ATM adaptation layer (AAL) header, and each byte (8 bits) of the residual 47 bytes is sampled data of the speech. In this way, in the ATM network, for the speech, the speech data is transmitted each ATM cell (47 samples per one ATM cell). However, a transmission interval of the ATM cells does not have the same exact periodicity in the different way as the STM networks.

FIG. 3 shows an example of a configuration combining the ATM networks, the STM networks, and present terminals. In the configuration, between the ATM network and the STM network, and between the ATM network and the present terminal (64-kbps STM terminal), cell assemblies and disassemblies (CLADs) for assembling and disassembling the ATM cells are respectively located. When subscribers in the STM networks communicate to each other through the ATM network, a cell delay in the CLAD occurs. Therefore, to realize the high-speed transmission, an additional delay in the echo canceller needs to be reduced as much as possible to improve its processing speed.

FIG. 4 shows the transmission interval of the ATM cell. As shown in FIG. 4, a standard transmission interval of the ATM cells in the same channel N is 125 μsec×47=5875 μsec (5.875 msec), in the case of 47 samples per one cell. However, in fact, a transmission timing of the ATM cell fluctuates, and, thereby, the transmission interval of the cells also fluctuates. The fluctuation of the transmission timing of the cell occurs due to a variation of a delay time in each cell pass (switch and transmission line) in the ATM network, and is approximately ±1.2 msec maximum for each ATM cell. Therefore, the transmission interval of the cell has a maximum 2.4-msec fluctuation. In the case of the maximum fluctuation, the ATM cells are applied to the echo canceller at a 3.475 msec (=5.875 msec−2.4 msec) interval. In this case, the echo canceller must process one cell of 47 samples in 3.475 msec.

When the echo cancellers are located in the networks shown in FIG. 3, it is necessary to include the echo cancellers for each STM terminal. Thus, a large number of echo cancellers are required. However, a method of placing the echo cancellers in the ATM network transmission line to process each cell is more efficient. In this case, when the cells are transmitted on a high-speed transmission line in the ATM network, for example, a 155-Mbps transmission line, a time length of one cell is about 2.778 μsec. Therefore, in the 5.875-msec transmission interval of the speech cells, a maximum of 2115 cells are generated.

FIG. 5 shows an illustration for explaining a conventional processing method of the echo canceller in the same way as that in the STM network. In FIG. 5, to process the maximum 2115 cells generated in the 5.875-msec transmission interval of the speech cells, 2115 hardware (echo cancellers) are located as corresponding to channels of these cells. FIG. 5 shows an operational timing of these echo cancellers. The delay time of the echo canceller may be reduced by using the latest technology. However, a large number of echo cancellers causes the size of the hardware to be large, thus it is difficult to miniaturize the hardware.

To process the cell whose transmission timing fluctuates as mentioned above with a high speed, the hardware needs to have a margin corresponding to the fluctuation. In this case, it is necessary to wait to process for a certain period of time. Therefore, it is difficult to realize a multiprocess for processing multichannels in the same hardware.

FIG. 6 shows an illustration for explaining a conventional method of the multiprocess. In the configuration shown in FIG. 6, a 1 hardware per 1 channel configuration is improved, and processing timings of an echo canceller having twice the conventional processing ability are shown. In FIG. 6, to the echo canceller, processes for a cell of a channel 1 (1 ch) and a cell of a channel 1058 (1058 ch) are allocated. FIG. 6 shows a case that the cell of 1058 ch is applied to the echo canceller earlier before the processing of 1 ch is finished. In this case, a buffer is included to store the cell of 1058 ch, and when the echo canceller is able to process the cell, the cell is read out and processed.

As mentioned above, there is a problem that the additional delay time in the echo canceller needs to be reduced as much as possible since the delay time occurs in the CLAD between the ATM network and the STM network. Further, in the ATM network, since the transmission timing of the cells fluctuates, the hardware of the echo canceller must have the margin corresponding to the fluctuation to process the cell with high speed. Further, since there is a case of waiting to process, the buffer is required. To meet these requirements, the hardware of the echo canceller is enlarged. And there is also a problem that the delay time in the echo canceller increases by buffering the cell.

SUMMARY OF THE INVENTION

It is an object of this invention to provide an echo canceller system. In the echo canceller system, when STM terminal sets communicate speech data to each other through an ATM network, a processing speed of the echo canceller can be increased and its delay time can be reduced as much as possible. Also, for ATM cells whose input timings fluctuate, the process of the echo canceller can be performed without a buffer. Further, a hardware scale of the echo canceller can be reduced. This permits the disadvantages described above to be eliminated.

The object described above is achieved by an echo canceller system for performing echo cancelling processing for a plurality of cells on a communication line, the system comprising: a plurality of echo canceller units to which the cells applied to the echo canceller system are allocated according to an applied order of the cells regardless of channels of the cells.

In the echo canceller system mentioned above, the applied order of the cells may be an order of cellslot numbers of the cells.

The object described above is also achieved by the echo canceller system mentioned above, wherein each of the echo canceller units has a multiprocessing function of processing the cells during a process interval of cells including speech data.

According to the above echo canceller system, high-speed processing for the plurality of cells may be realized.

In the echo canceller system mentioned above, wherein the system further may comprise a common storage circuit, connected to the echo canceller units through a bus, for storing data necessary for the echo cancelling processes for each channel providing a cell to be processed, and each of the echo canceller units detects the channel from a header of the cell and accesses the data for the channel from the common storage circuit.

The common storage circuit may comprise: a first common RAM storing tap data and tap coefficients for the each channel providing the cell to be processed; and a second common RAM storing data for updating the tap coefficients and controlling the data.

In the echo canceller system, each of the echo canceller units may comprise: an echo canceller circuit multiprocessing to generate a quasi-echo, calculate a remaining echo, and update the tap coefficients by accessing the first common RAM; and a digital signal processor multiprocessing to calculate update coefficients of the tap coefficients, detect a specified signal, and control the echo canceller circuit.

The object described above is also achieved by the echo canceller system mentioned above, wherein the echo canceller system further comprises: a common bus connecting a plurality of the echo canceller circuits and a plurality of the digital signal processors in the echo canceller units; and a controller allocating a usable time of the common bus to the digital signal processors according to an input timing of the cell.

The above-mentioned controller allocates the usable time of the common bus to the digital signal processors in an order of body numbers of the digital signal processors and produces the body number of the digital signal processor to which the usable time of the common bus is presently allocated to the other digital signal processors, whereby each of the other digital signal processors recognizes a timing when the usable time of the common bus will be allocated to itself based on the produced body number from the controller.

The object described above is also achieved by the echo canceller system mentioned above, wherein a number of the echo canceller units is determined by a number of cellslots generated on the communication line during the process interval of the cells including the speech data, and the cells in the cellslots are permanently allocated to the echo canceller units according to the cellslot numbers of the cells.

The object described above is also achieved by the echo canceller system mentioned above, wherein a number m of the echo canceller units is determined by n times a number of cellslots generated in the communication line during the process interval of the cells including the speech data, and the cells in the cellslots are permanently allocated to the specified echo canceller units each n times the process interval.

The object described above is also achieved by the echo canceller system mentioned above, wherein the first common RAM and the second common RAM respectively include i banks (i is an integer larger than 1), the echo canceller units accessing all data stored in the first common RAM and the second common RAM by accessing each bank.

The above-mentioned first common RAM and the second common RAM respectively may store the all data for all the channels, the data to be stored in each channel being divided into i parts which are stored in the banks.

In the echo canceller system mentioned above, the echo canceller circuits are constructed with i groups of the circuits; the digital signal processors are constructed with i groups of the processors; the echo canceller system further comprises a first bus switch switching data buses between the i banks of the first common RAM and the i groups of the circuits, and a second bus switch switching data buses between the i banks of the second common RAM and the i groups of the processors; and each of the i groups of the circuits accesses all banks of the first common RAM by switching of the first bus switch, and each of the i groups of the processors accesses all banks of the second common RAM by switching of the second bus switch.

The object described above is also achieved by an echo canceller system for performing echo cancelling processing on a plurality of cells in a communication line, the system comprising: a common input data line receiving the plurality of cells which includes cells from a transmission line and cells from an echo pass; a common output data line producing echo-cancelling-processed cells; a plurality of echo canceller units, each of the units having a multiprocessing function of processing the cells received from the common input data line during a process interval of cells including speech data; and a common storage circuit, connected to the echo canceller units through a bus, storing data necessary for the echo cancelling processing for each channel providing a cell to be processed; wherein each of the echo canceller units detects the channel from a header of the cell and accesses the data for the channel from the common storage circuit.

According to the echo canceller system, the echo canceller system includes the plurality of echo canceller units, and the cells applied to the echo canceller system are sequentially allocated according to the applied order (the cellslot number) of the cells regardless of channels of the cells. Therefore, the cell can start to be processed as soon as the cell is applied to the system without the waiting time. Since there is no waiting time for the process of the hardware, input buffers are unnecessary.

And, according to the echo canceller system, each of the echo canceller units has the multiprocessing function of processing the cells during the process interval of the cells including the speech data. Therefore, the processing ability of the echo canceller units can be improved, and the delay time in the echo cancelling process may be minimized to only the processing time of the echo canceller unit.

Therefore, extreme miniaturization of the hardware, reduction of the process delay, and fixing of the process delay are simultaneously realized.

Further according to the echo canceller system, the common storage section (the common RAMs) are located outside the echo canceller units. Therefore, this makes it possible to simplify the design of an echo canceller unit large scale integration (LSI). This leads to miniaturization of the hardware scale of the echo canceller system in the ATM networks.

Other objects and further features of the present invention will be apparent from the following detailed description when read in conjunction with the accompanying drawings.

BRIEF DESCRIPTION OF THE DRAWINGS

FIG. 17 shows an illustration for explaining a relationship between cellslot timings and memory-data transmission timings of each EC unit.

DESCRIPTION OF THE PREFERRED EMBODIMENTS

Figure 1:
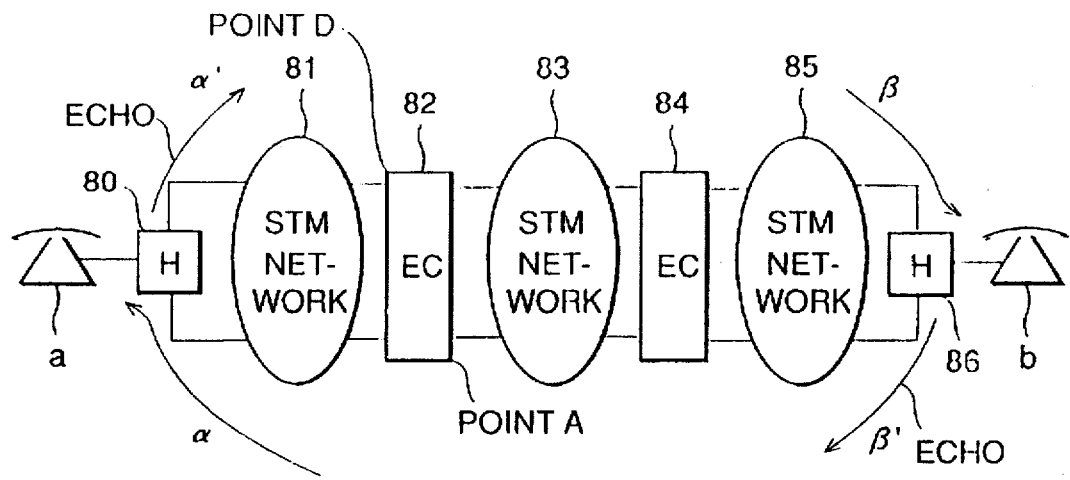
FIG. 1 shows an application example of conventional echo cancellers in STM networks.
Figure 2:
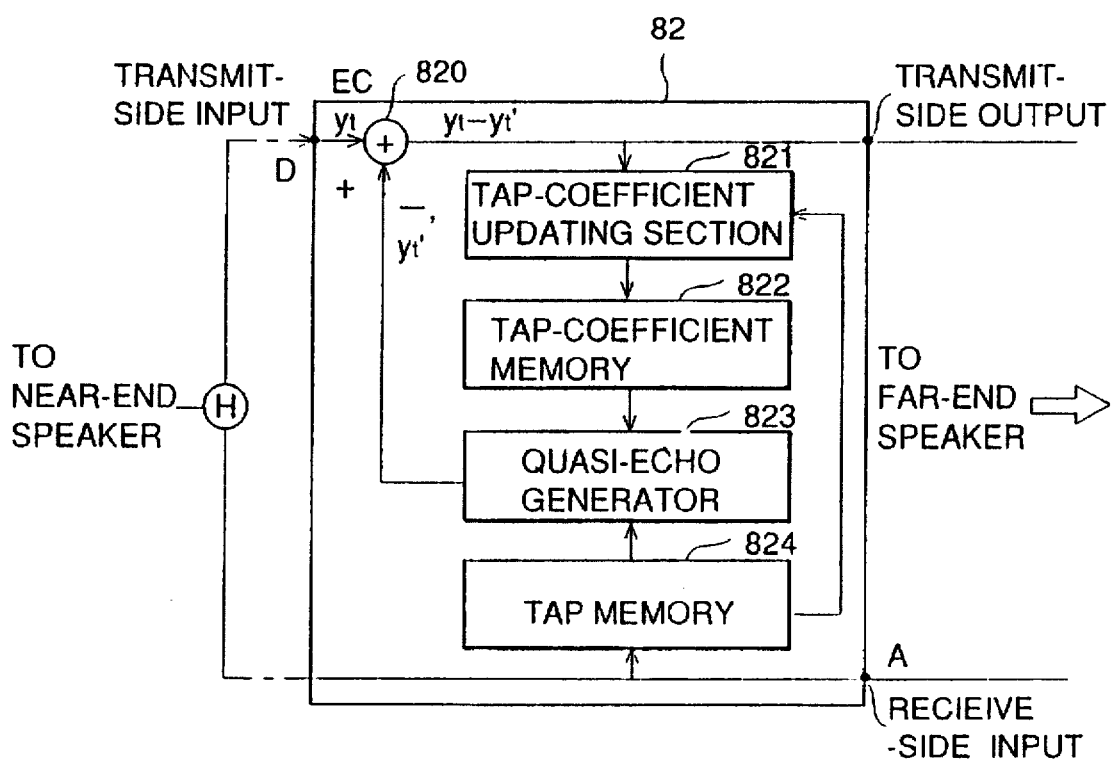
FIG. 2 shows a block diagram of a configuration of the conventional echo canceller.
Figure 3:
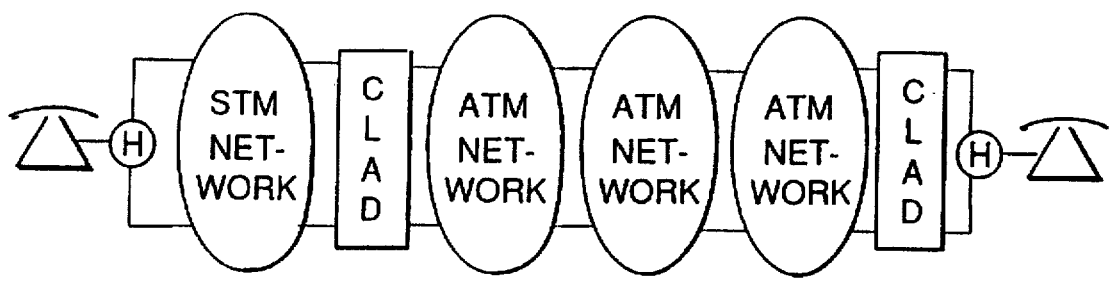
FIG. 3 shows an example of a configuration combining ATM networks, the STM networks, and present terminals.
Figure 4:
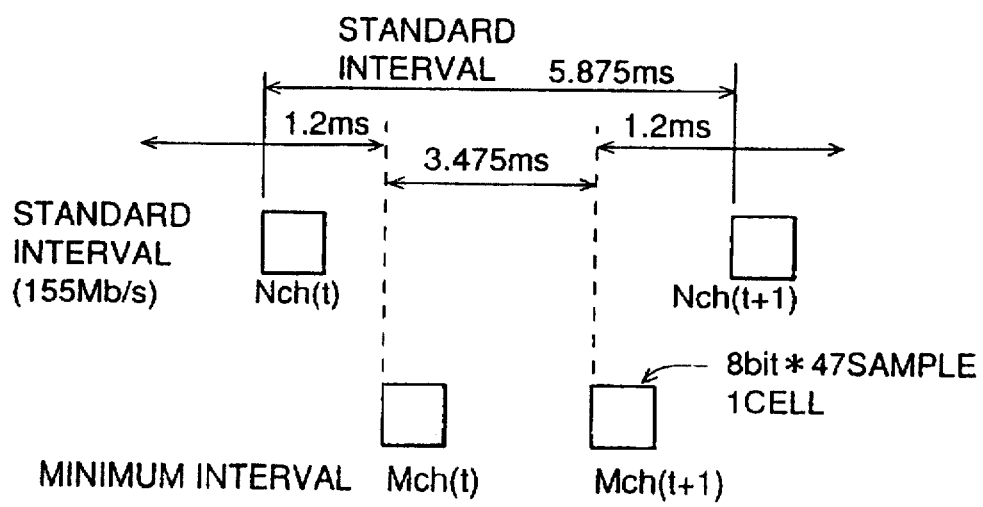
FIG. 4 shows a transmission interval of an ATM cell.
Figure 5:
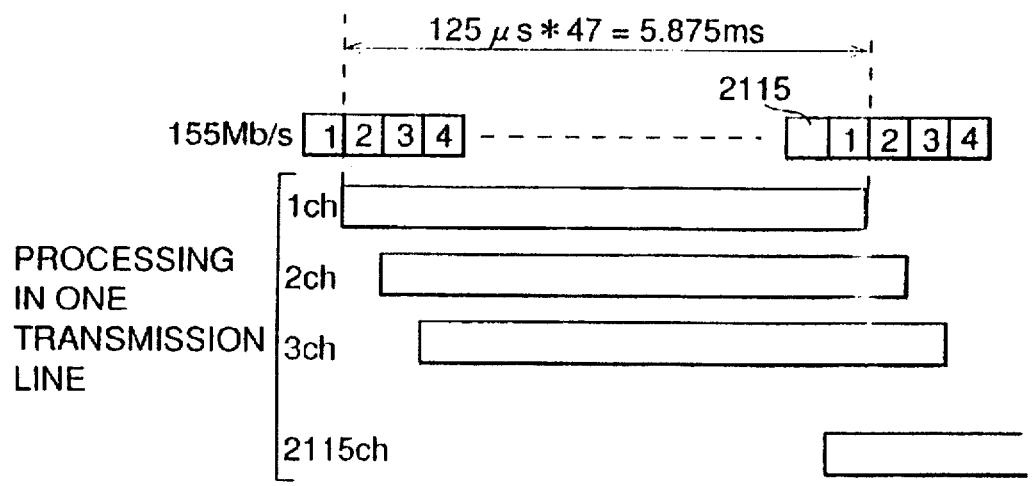
FIG. 5 shows an illustration for explaining a conventional processing method of the echo canceller in the same way as that in the STM network.
Figure 6:
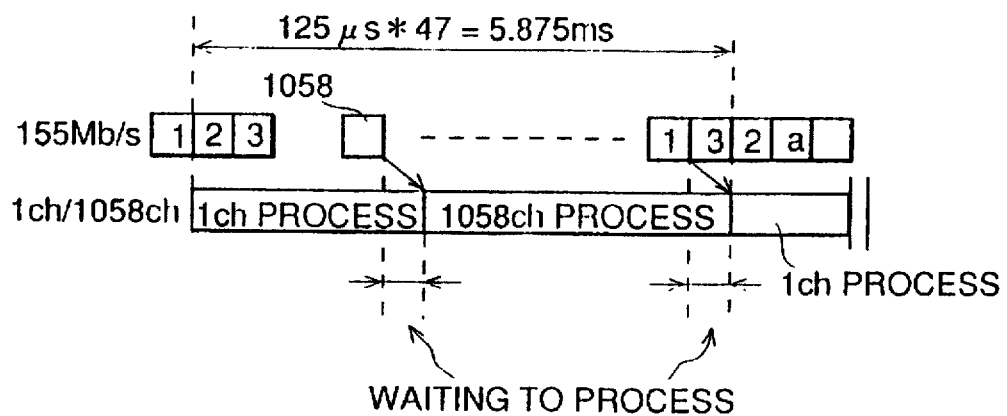
FIG. 6 shows an illustration for explaining a conventional method of multiprocessing.
Figure 7:
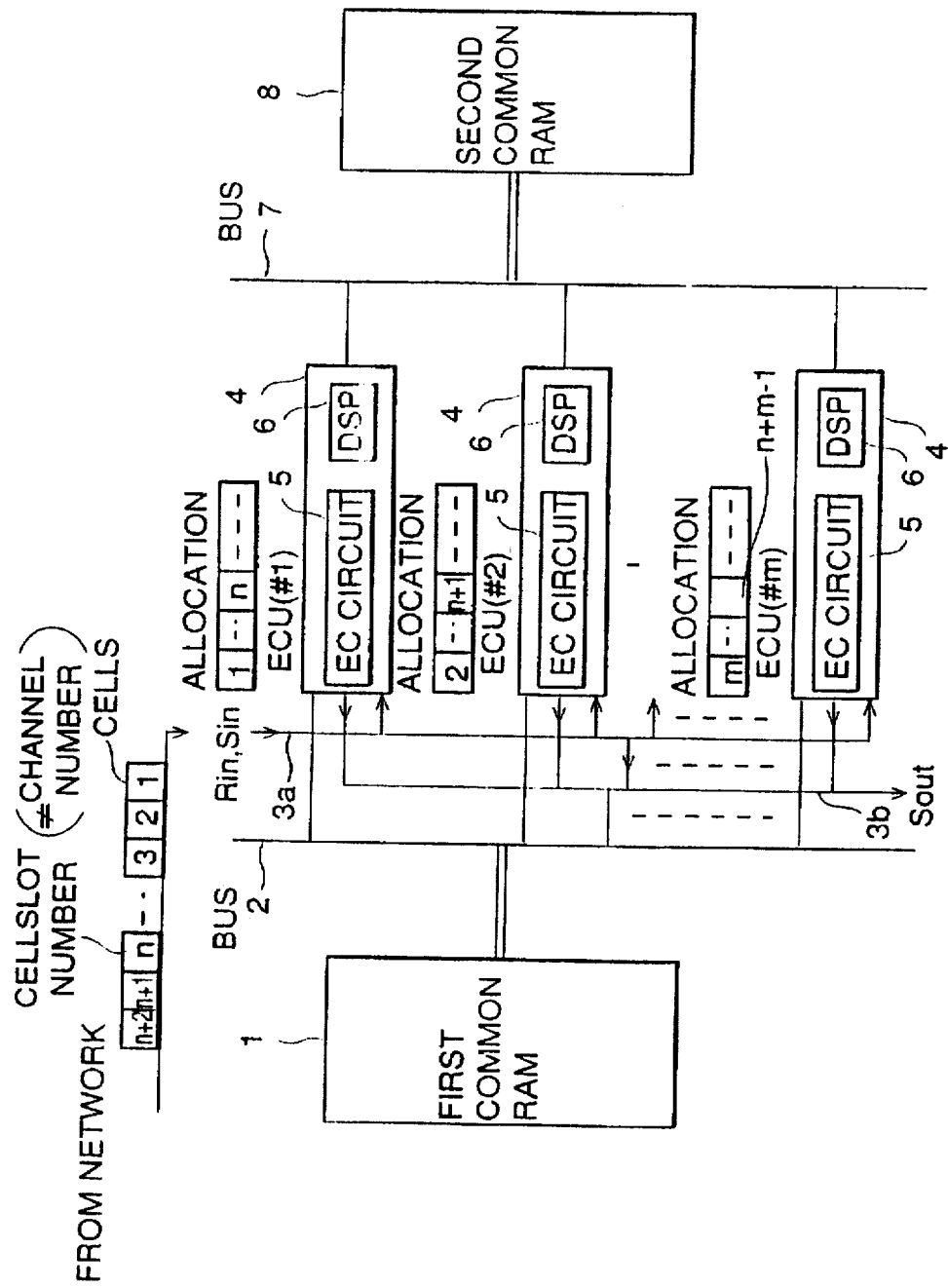
FIG. 7 shows a block diagram of a configuration for explaining an operation principle of an echo canceller system according to the present invention.

First, a description will be given of an operation principle of an echo canceller system according to the present invention. FIG. 7 shows a block diagram of a configuration for explaining the operation principle of the echo canceller system according to the present invention. In FIG. 7, a first common random access memory (RAM) 1 stores past tap data (speech data) and tap coefficients corresponding to channels in a transmission line. A receive-side input (Rin) and a transmit-side input (Sin) are applied to an input data line 3a, and a transmit-side output (Sout) is produced to an output data line 3b. The input data line 3a and the output data line 3b are connected to a plurality of echo canceller units (ECUs) 4. Each of the ECUs 4 comprises an echo canceller (EC) circuit 5 and a digital signal processor (DSP) 6. The ECU 4 generates a quasi-echo, calculates a remaining echo, and updates tap coefficients. Further, the ECU 4 detects double talk (speeches are simultaneously generated from both terminals) and a disable tone (a tone signal for disabling the echo canceller before analog modem communications start), and has controls to stop the process of the echo canceller. Each EC unit 4 can process m channel cells in one speech cell interval (=5.875 msec, which is called a process interval), namely the EC 4 has an ability of m multiprocessing. The echo canceller system comprises m EC units (#1 to #m).

The EC circuit 5 is supplied with receive signals (Rin, Sin) from the input data line 3a, and performs an echo cancelling operation based on the data stored in the first common RAM 1, etc., to produce the transmit signal (Sout) to the output data line 3b. The DSP 6 calculates power of the receive-side input (Rin), the transmit-side input (Sin), and the remaining echo, and processes data for updating the tap coefficients. Further, the DSP 6 detects the double talk and the disable tone and controls the EC circuit 5 to be invalidated (non-linear process). A second common RAM 8 stores data necessary for processing in the DSP 6 (data of the cell from each channel for calculating new tap coefficients to be updated, and data for detecting specified signals, etc.). The data stored in the first common RAM 1 is accessed through a bus 2, and the data stored in the second common RAM 8 is accessed through a bus 7.

The present invention realizes the multiprocessing in the echo canceller system without buffers and reduces a hardware scale and a process delay for ATM cells of speech data in an ATM high-speed transmission line. In the echo canceller system, the cells from many channels are not allocated to specified hardware, and can be allocated to any hardware which can process any cells. Therefore, waiting time to process the input data may be removed. Accordingly, the echo canceller system comprises the echo canceller (EC) unit which can perform the multiprocessing for the echo cancelling operation, the first common RAM storing the data necessary for cancelling the echo, and the second common RAM storing the data necessary for each channel's signal processing and controlling. Each EC unit can access both common RAMs through the buses with a high speed.

In the echo canceller system shown in FIG. 7, when the receive-side input signal (Rin) and the transmit-side input signal (Sin) having many cells (cellslots) are applied to the input data line 3a, the cells are input to free ones of the EC units 4. When the cell is input to the EC unit 4, a cellslot number of the cell is also applied to the EC unit 4. The EC circuit 5 loads data necessary for the EC process corresponding to the cellslot number from the first common RAM 1 through the bus 2. The EC circuit 5 processes an input signal with the data loaded from the first common RAM 1 and generates a quasi-echo and calculates a remaining echo. The DSP 6 loads data corresponding to the channel from the second common RAM 8 through the bus 7. Based on the data, the DSP 6 updates the tap coefficients, detects the double talk and the disable tone signal, and controls the EC circuit 5.

A result (the remaining echo signal) of processing the echo cancelling operation in the EC unit 4 is produced to the output data line 3b. The tap data and the updated tap coefficients are saved in the initial location of the first common RAM 1 corresponding to the channel. In the second common RAM 8, the data is saved in the location corresponding to the cellslot. In this way, a plurality of cells are processed in such a multiprocessing form by using the EC units 4 in time division. Therefore, each EC unit 4 can process any cellslot.

Each EC unit 4 can perform the echo cancelling processing of n cells (n multiprocessing) for the process interval of 5.875 msec which is the transmission interval of the speech cell. Therefore, m EC units 4 can process a total of n×m cells for that process interval.

In general, in the ATM transmission, each cell is not located in the specified cellslot (periodical location in a time scale where a cell is located). Therefore, it is unclear which of cellslots has the data before the cell is received and control data (including channel information) of the cell is checked. Thus, the EC unit (which is free after the latest process) allocated to the cellslot checks the cell and discriminates the channel to perform the process.

In this way, the EC unit 4 is constructed with the EC circuit 5 and the DSP 6. The data used in each EC unit 4 is stored in the common RAM. The EC unit 4 can perform the multiprocessing for any channel by improved processing ability. Therefore, the hardware scale may be reduced. And just after the cell is applied to the echo canceller system, the cell can be processed, so that the delay time in the echo canceller may be minimized.

Figure 8:
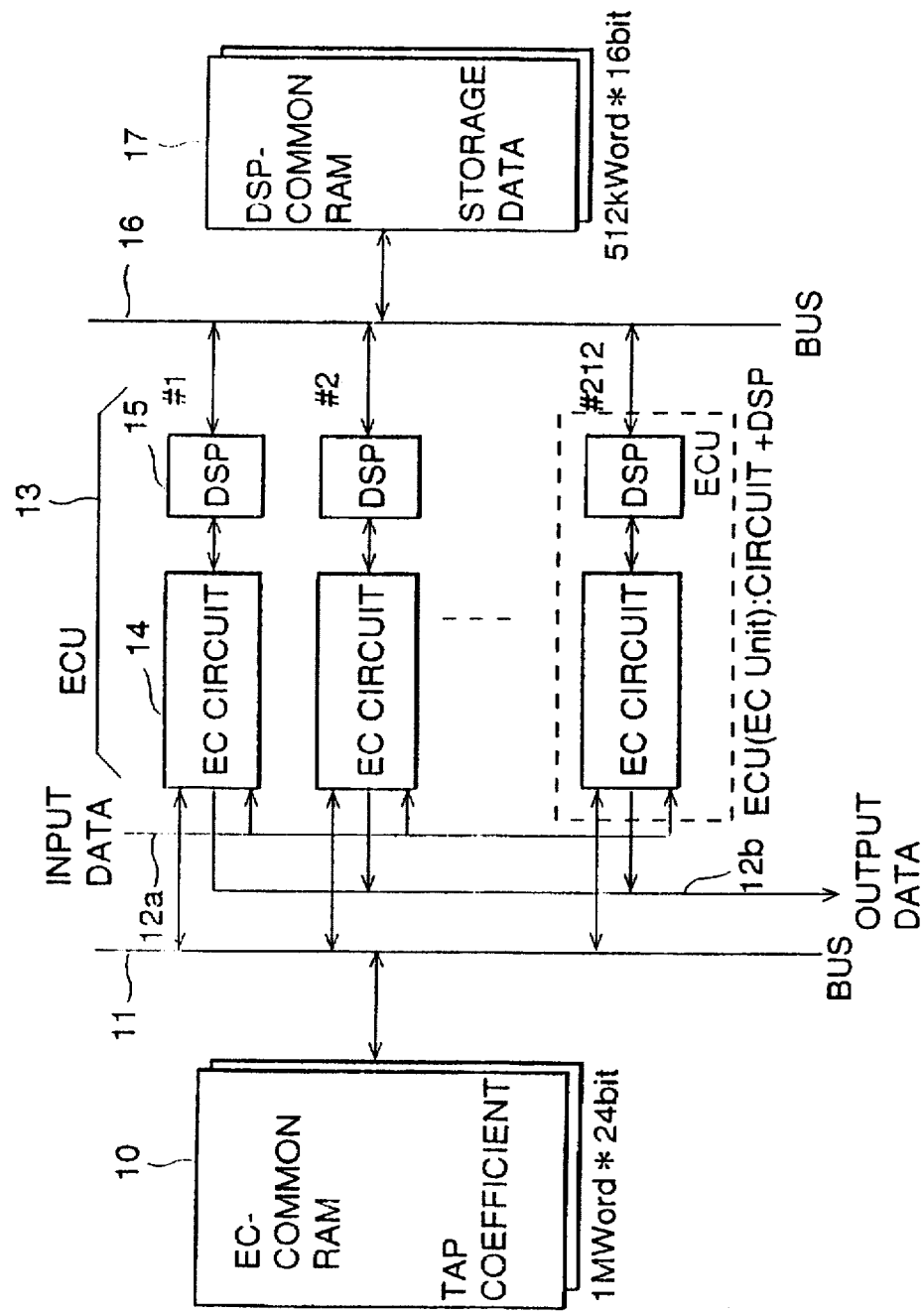
FIG. 8 shows a block diagram of a first embodiment of the echo canceller system according to the present invention.
Figure 9:
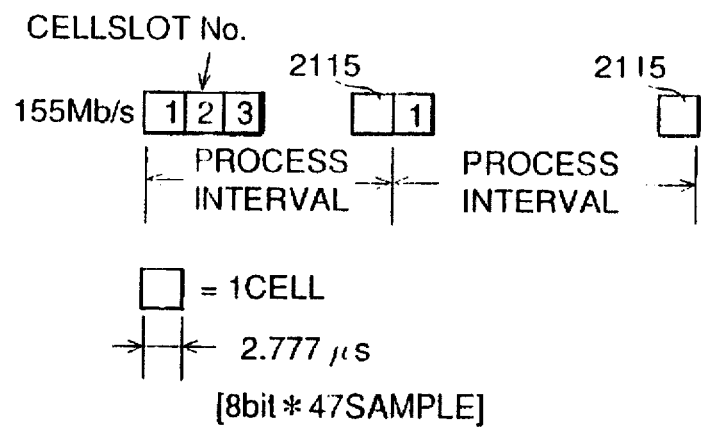
FIG. 9 shows an illustration for explaining a relationship between data and a cellslot.

Next, a description will be given of a first embodiment of the echo canceller system according to the present invention, by referring to FIG. 8 and FIG. 9. FIG. 8 shows a block diagram of the first embodiment of the echo canceller system according to the present invention. FIG. 9 shows an illustration for explaining a relationship between the data and the cellslot.

In FIG. 8, an EC-common RAM 10 and a DSP-common RAM 17 respectively correspond to the first common RAM 1 and the second common RAM 8 shown in FIG. 7. Elements 11, 12a, 12b, 13 to 16 in FIG. 8 are respectively the same as those 2, 3a, 3b, 4 to 7 shown in FIG. 7.

This embodiment shows an example of a cell-based echo canceller system located in one 155-Mbps link (corresponds to the speech data line having 2016 channels) of the ATM network. In the ATM networks, each cell has 53 bytes. When the data of the cell is the speech data, 47 bytes (47 samples) of the cell are allocated to the speech data.

As shown in FIG. 9, in the 155-Mbps transmission line, the time length of one cell is 2.7778 μsec. The cells having the speech data occurs at the 5.875-msec interval (125 μsec×47 samples). Therefore, a number of cells which can be transmitted for the 5.875-msec interval is 2115 (=5.875 msec/2.7778 μsec). Namely, if a formation of the cell located in the transmission line is represented by the cellslot, there are 2115 cellslots in the process interval 5.875 msec.

In the example shown in FIG. 8, 2115 cells are processed in the process interval of 5.875 msec. Each EC unit (ECU) 13, namely each EC circuit 14 and each DSP 15, can perform 10 multiprocessing (m=10), and 212 EC units 13 are located in the echo canceller system. Thus, the system has an ability of processing 2115 cells in the process interval.

The EC-common RAM 10 stores the data necessary for performing the echo cancelling operation by using the FIR filter of the EC circuit 14. Namely, the data includes the tap data (previous speech data) and the tap coefficient data for each channel, which are 512 words (1 word=24 bits). 24 bits constructing the word consists of 16-bit tap data and 8-bit tap coefficient data. Therefore, the EC-common RAM 10 has a memory capacity of 1 MW×24 bits.

Each cell in the input signals (Rin, Sin) from the input data line 12a has 47 sample data (1 sample data=8 bits), each sample data being constructed with compressed codes. The compressed codes are decompressed to be converted to linear codes in the EC circuit 14, and, vice versa. Each EC circuit 14 calculates the quasi-echo with estimation of the echo pass (determination of the tap coefficients and the tap data) and updates the tap coefficients in time division. The update coefficients are calculated in the DSP 15.

The DSP-common RAM 17 stores the data for producing the update coefficients of the filter, the power information, and the data for detecting the specified signal and the specified condition (the disable tone signal and the double talk condition). The data of 256 words (1 word=16 bits) is stored for each of the 2115 channels. Therefore, the DSP-common RAM 17 has a memory capacity of 512 kW×16 bits.

The DSP 15, accompanying with the EC circuit 14, calculates speech power of the receive-side input signal (Rin in FIG. 7) and the transmit-side input signal (Sin in FIG. 7), and also calculates speech power of the remaining echo. The DSP 15 further calculates the update coefficients of the tap coefficients and detects the disable tone signal and the double talk condition.

Next, a description will be given of a method of allocating the cells to the ECUs in the echo canceller system shown in FIG. 8. In the echo canceller system, for the multiprocessing, a processing speed of each ECU 13 is set to n times a processing speed of the hardware of the conventional echo canceller. The hardware of n=10 may be easily realized by using the present technologies. The first following description shows the case of n=10 for simplification of the description. As will be mentioned later, cases of n=15 and n=12 may be also realized.

Figure 10:
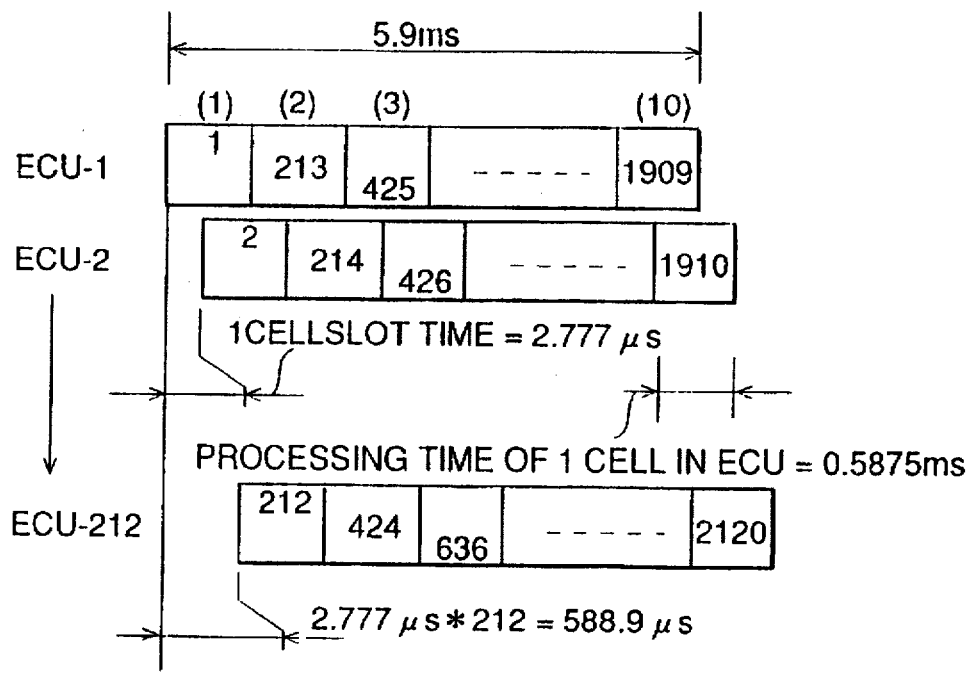
FIG. 10 shows a first embodiment of a method of allocating the cells in an ATM network to ECUs in the echo canceller system shown in FIG. 8.

FIG. 10 shows a first embodiment of the method of allocating the cells in the ATM network to the ECUs in the echo canceller system shown in FIG. 8. In the method, 212 ECUs 13 (represented by ECU-1 to ECU-212) are located. Each ECU has ten times the processing ability of the conventional hardware which can process 1 channel for 125 μsec×47 samples (=5.875 μsec). Therefore, each ECU can process 1 cell for 0.5875 msec, namely can process 10 cells for 5.875 msec. A number written in a cell block represents a cellslot number, which is different from the channel number written in the header of the cell. In the method, input cellslots are sequentially allocated to ECU-1, ECU-2, ... regardless of the channel number. After the 212-th cellslot is allocated to ECU-212, the 213-th cellslot is allocated to ECU-1 again to be processed. By this time, in ECU-1, the processing for the 1st cellslot has been finished.

In the cells applied to the echo canceller system, idle cells and non-speech data cells are also included. For these cells, no process is carried out in the EC unit (ECU). Each ECU sequentially processes 10 channels (which are represented by numerals (1) to (10) in FIG. 10).

In the above method, each ECU hardware does not correspond to the channel of the cell. Therefore, as the cells are sequentially applied to the system, the applied cells are allocated to the ECUs in that order and are processed without the waiting time. In this way, the waiting time to process the applied cell may be eliminated. Furthermore, the delay time in the process is decreased to 1/10 (1/n in the case of n multiprocessing) the delay time of the conventional echo canceller. The total scale of the EC units is also decreased to 1/10 (1/n in the case of n multiprocessing).

Next, a description will be given of the operation of the EC unit.

When the cell is applied to the echo canceller system, the channel information of the cell can be detected from the header of the applied cell. Based on the channel information, the following processes (a) to (d) are carried out.

(a) The tap data, etc., to be processed in the EC circuits 14 of the ECUs 13 is loaded from the EC-common RAM 10.

(b) The storage data to be processed in the DSPs 15 of the ECUs 13 is loaded from the DSP-common RAM 17.

(c) In each ECU 13, the echo canceller processing is performed for 47 samples. The processed speech data cell is produced to the output data line 12b (with the fixed delay).

(d) After the process, the updated data is saved in the EC-common RAM 10 and the DSP-common RAM 17.

After that, the processes (a) to (d) are repeated in that order.

Next, descriptions will be given of other methods of allocating the cells to the ECUs in the echo canceller systems, by referring to FIGS. 11 to 14.

Figure 11:
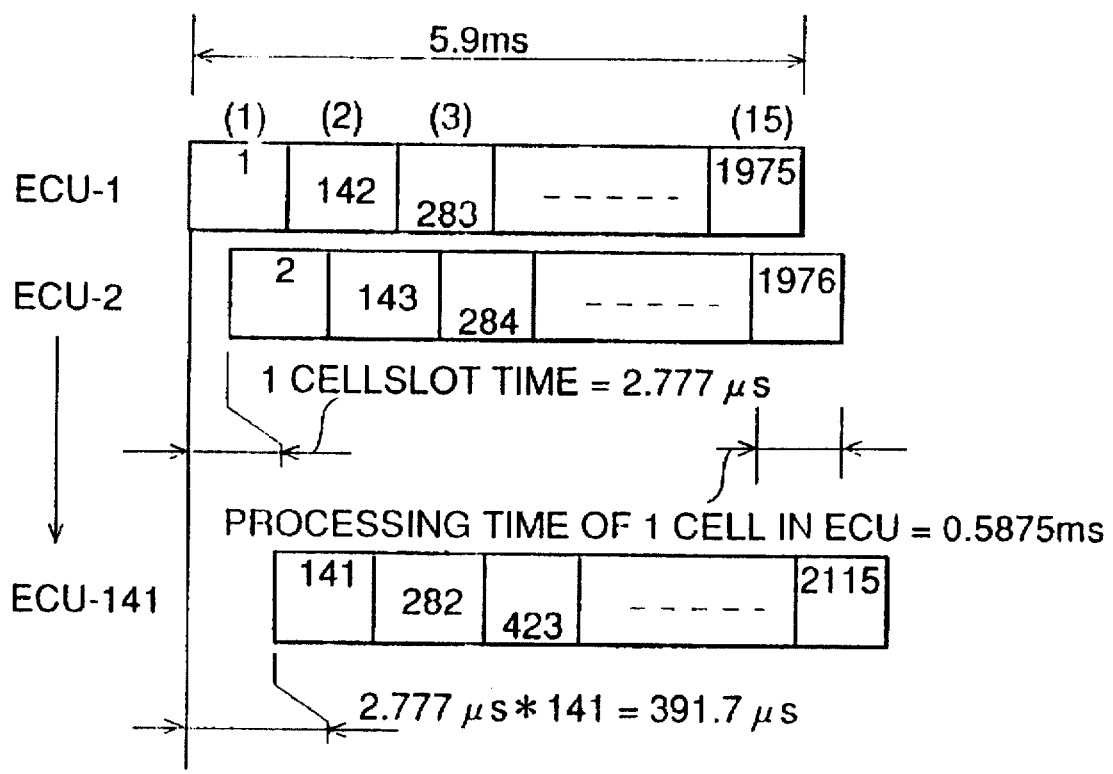
FIG. 11 shows a second embodiment of the method of allocating the cells in the ATM network to the ECUs in the echo canceller system.

FIG. 11 shows a second embodiment of the method of allocating the cells in the ATM network to the ECUs in the echo canceller system. Returning to FIG. 10, the number of ECUs is 212, which is not a factor of the number of cellslots (2115=3×3×5×47). Therefore, in the first cycle of the processing, the 1st cellslot is processed in ECU-1 and the 2015-th cellslot is processed in ECU-207. And, in the second cycle, the 1st cellslot is processed in ECU-208. In this way, the cellslot is not always allocated to the same specified hardware.

On the other hand, in the method shown in FIG. 11, the number of ECUs is 141, which is a factor of the number of cellslots (2115=141×15). Each ECU can perform 15 multiprocessing (which is represented by (1) to (15)). Therefore, the 2115 cellslots can be equivalently allotted to each of ECUs (ECU-1 to ECU-141). In this way, the cellslot can be processed in the specified hardware (ECU). This improves a debug efficiency, etc., of the hardware.

Figure 12:
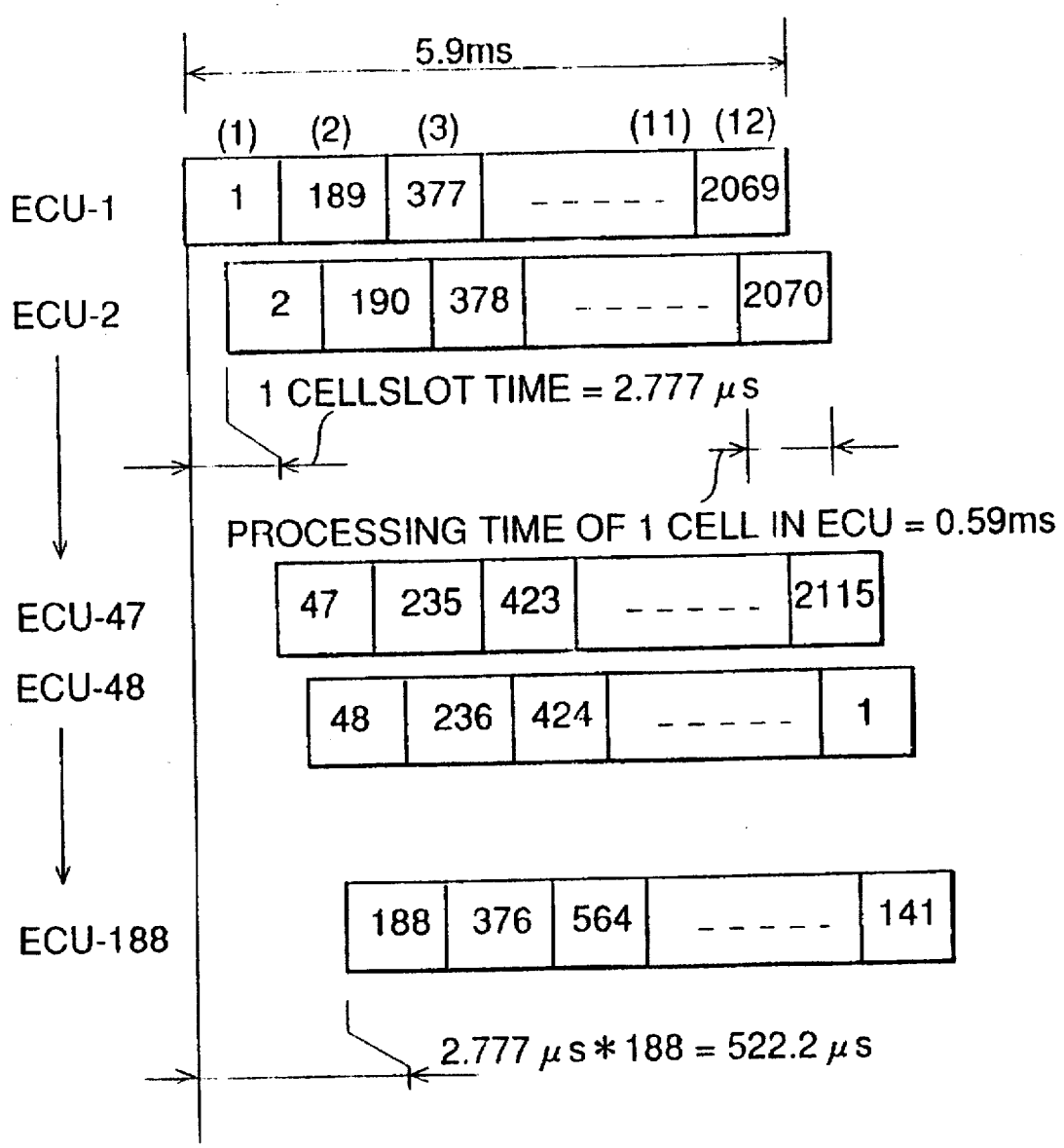
FIG. 12 shows a third embodiment of the method of allocating the cells in the ATM network to the ECUs in the echo canceller system.

FIG. 12 shows a third embodiment of the method of allocating the cells in the ATM network to the ECUs in the echo canceller system. In the above embodiment shown in FIG. 11, the number of ECUs is 141. In this configuration, it is difficult to realize a plurality of banks in an access to the common RAMs, and operations of the buses accessing the memories can not be allotted in the same rate. In FIG. 12, 188 ECUs are located, wherein each ECU can perform 12 multiprocessing (which is represented by (1) to (12)). The number 188 is a multiple of the number (4 is set in this case) of the banks of the common RAM, and, thus, the bus operations for accessing the memories may be easily distributed in the same rate. However, since the number of cellslots (2115) is not a multiple of 4, some cells are left over.

Figure 13:
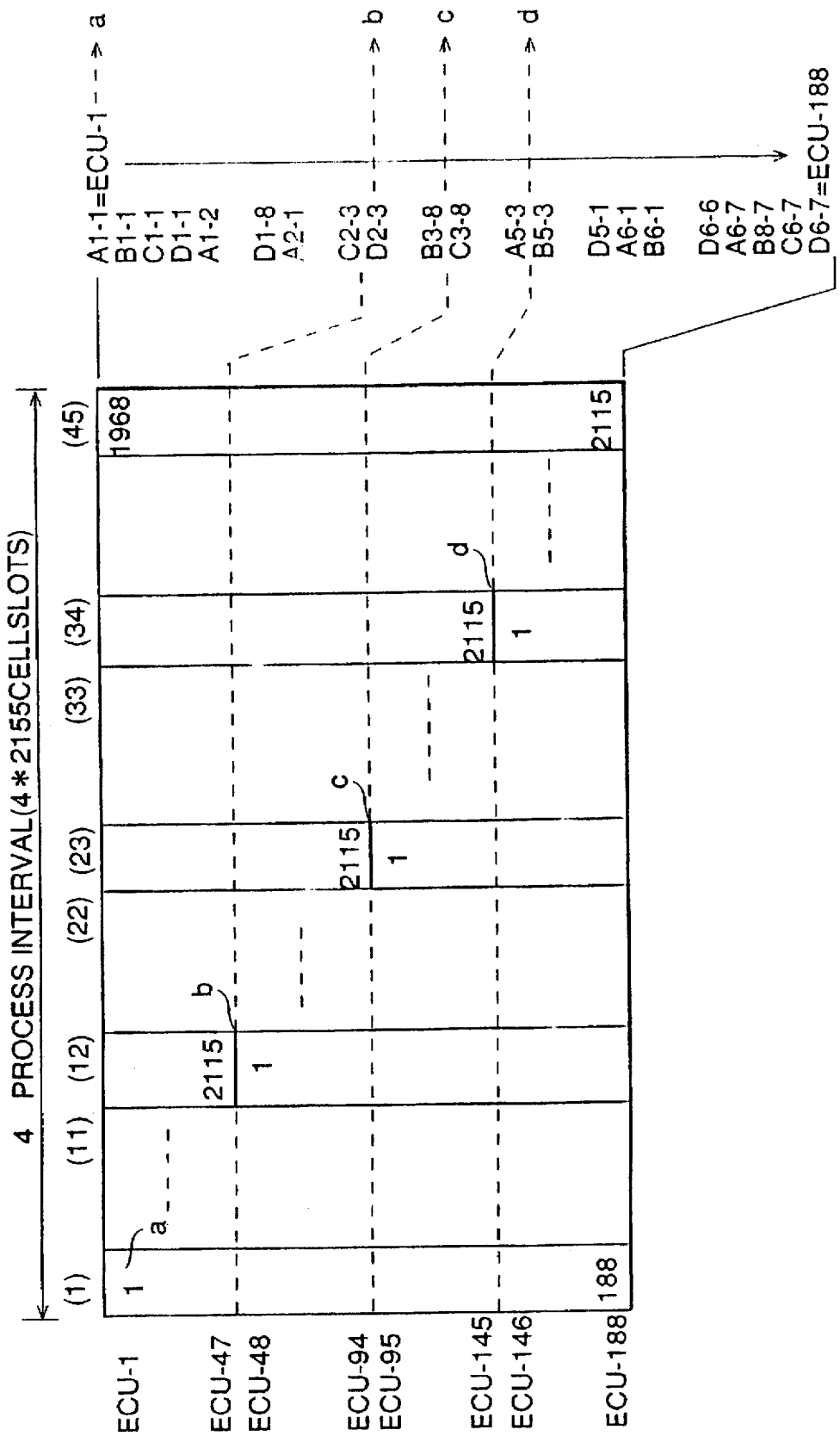
FIG. 13 shows an illustration for explaining a periodical allocating operation of the third embodiment of the method shown in FIG. 12.

FIG. 13 shows an illustration for explaining a periodical allocating operation of the third embodiment of the method shown in FIG. 12.

Though the number of cellslots (2115) is not the multiple of 4 as mentioned above, the cellslots are allocated to the specified hardware (ECUs) at the 2115×4 process interval. In FIG. 13, in the first process cycle of the 2115 cellslots, the 1st cellslot shown by numeral a is allotted to ECU-1, the 2115-th cellslot is allotted to ECU-47 with the 12-th multiprocessing. In the second process cycle of the 2115 cellslots, the 1st cellslot shown by numeral b is allotted to ECU-48. In the third process cycle of the 2115 cellslots, the 1st cellslot shown by numeral c is allotted to ECU-95 with the 23rd multiprocessing. In the fourth process cycle of the 2115 cellslots, the 1st cellslot shown by numeral d is allotted to ECU-146 with the 34-th multiprocessing. In the fifth process cycle of the 2115 cellslots, the 1st cellslot is allotted to ECU-1 again. In this way, each 4 process intervals (4×2115 cellslots), the cellslots are associated with the same ECUs.

When assembling the echo canceller system shown in FIG. 7 on a print board, it is difficult to assemble all the circuits including the EC-common RAM 10 and the DSP-common RAM 17 on the one print board, since the number of the EC units 13 is extremely large. Therefore, it is necessary to divide the elements of the system into at least two sections. In an LSI circuit constructing EC circuits 14 and DSPs 15, signal transmission in the DSP is not critical because of a small number of DSPs. In general, the EC circuit 14 is located close to the DSP 15 as an integrated EC unit. However, in the present invention, higher data transmission is required between the EC circuit 14 and the EC-common RAM 10 and between the DSP 15 and the DSP-common RAM 17. Therefore, in the echo canceller system according to the present invention, a set of the EC circuit 14 and the EC-common RAM 10, and a set of the DSP 15 and the DSP-common RAM 17 are respectively assembled on different print boards. Namely, in the assembly of the EC unit 13 in the echo canceller system, the EC circuit 14 is separated from the DSP 15.

Figure 14:
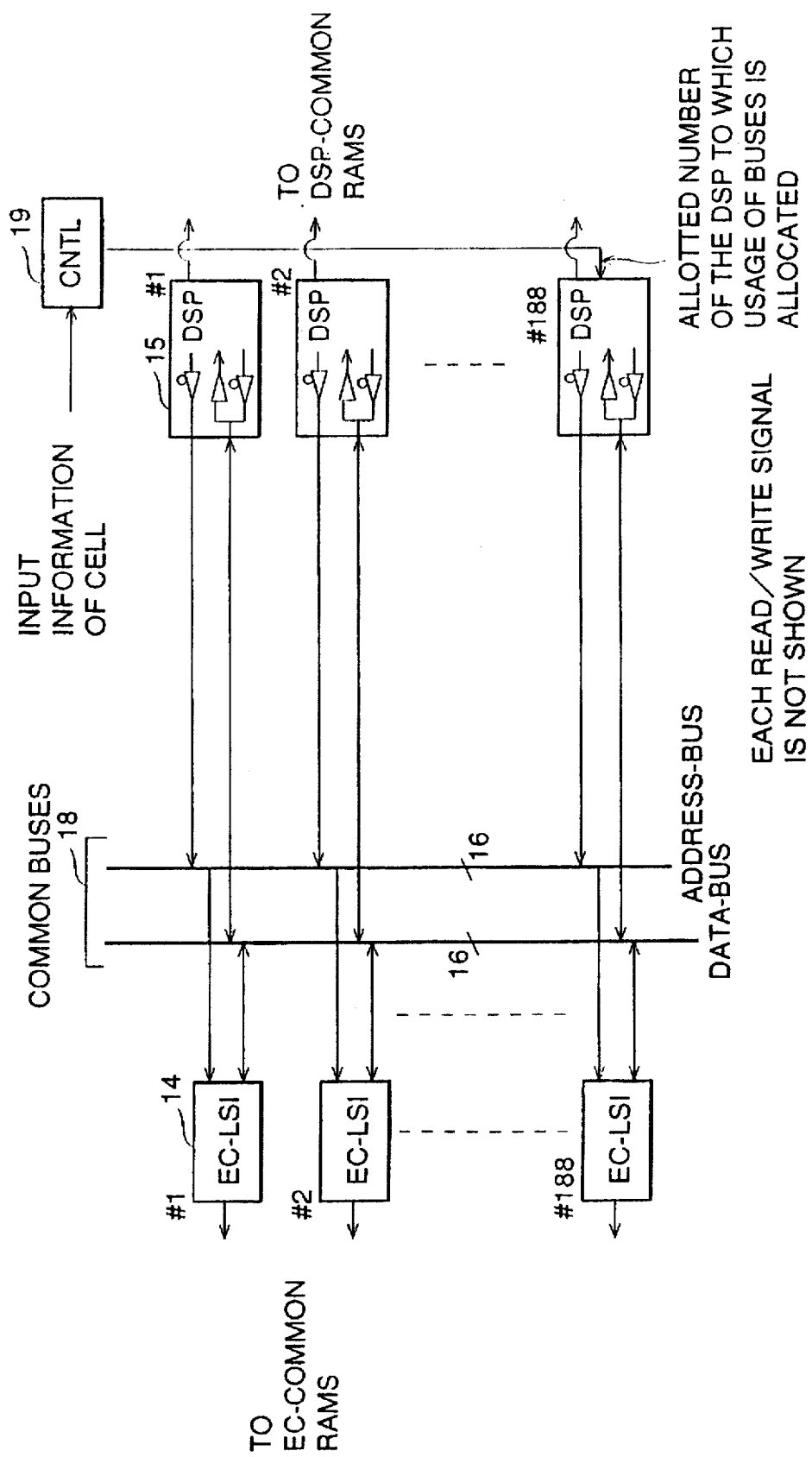
FIG. 14 shows a configuration of common buses between EC-LSI circuit (EC circuit 14) and DSP.

FIG. 14 shows a configuration of common buses between EC-LSI circuits (EC circuit 14) and DSP. In FIG. 14, the EC-common RAM 10 with the bus 11 and the DSP-common RAM 17 with the bus 16 are not shown for simplification of the description. A description of a configuration for transmitting data on the buses 11, 16 will be given later by referring to FIGS. 15 and 16. FIG. 14 shows a case that 188 EC-LSI circuits 14 and 188 DSPs 15 (188 EC units 13) are located in the same way as that shown in FIG. 12.

When the set of the EC-common RAM 10 and the EC circuits (EC-LSI circuits) 14 is assembled on one print board and the set of the DSPs 15 and the DSP-common RAM 17 is assembled on another print board, a method is required for transmitting data between the EC-LSI circuits 14 and the DSPs 15. To meet the above requirement, common buses 18 are used. The common buses 18 are located on, for example, the print board in which the DSPs are assembled. A controller CNTL 19 controls usage of the common buses 18.

In general, the EC-LSI circuit 14 and the DSP 15 are connected to each other through a parallel interface. When the above two circuits are separated into two boards, connecting the 16-bit parallel interfaces between the 188 EC-LSI circuits 14 and the 188 DSPs 15 is not practical because of the large number of lines. On the other hand, when using serial interfaces, the number of lines transmitting the data between the EC-LSI circuits 14 and the DSPs 15 is reduced. However, since there is a case that as soon as data is produced from the DSP 15, the data must be applied to the EC-LSI circuit 14, the serial interfaces can not be used. Accordingly, a configuration locating the common buses as shown in FIG. 14 is effective.

In the echo cancelling process, interfacing (transmitting data to each other) between the DSP 15 and the EC-LSI circuit 14 takes an almost constant time. Therefore, the controller 19 checks input information (information indicating a timing when the cell has been applied to) of the cell, and dynamically allocates the usage of the common buses 18 to each DSP 15, thereby, the interfacing between the DSPs 15 and the EC-LSI circuits 14 may be realized with the common buses 18.

Since the allocation of the usage of the common buses 18 in the controller 19 is carried out in a time scale, it is unclear when the usage of the common buses 18 is allocated to the DSP 15. Therefore, an allotted number of the DSP to which the usage of the common buses 18 is allocated is transmitted to each DSP from the controller 19. The controller 19 has a counter for increasing the allotted number of the DSP. Thus, the DSP can determine how long it takes until the usage of the common buses 18 is allocated to itself.

In the configuration shown in FIG. 14, when the transmission speed of the data is not sufficient, locating a plurality of common buses is effective to resolve that problem.

In the conventional echo canceller system, for processing with a 64-msec delay, 512 taps (for the FIR filter) are necessary. Therefore, the storage data needs 512-word tap coefficients and 512-word receive signals (tap data). The storage data is stored before being transmitted to the EC-common RAM 10. The quantity of the storage data corresponds to the number of the cellslots (2015). In this case, as mentioned above, the EC-LSI circuit 14 loads desired data from the EC-common RAM 10 before processing, and saves the data in the EC-common RAM 10 after processing.

This access must be finished within the cellslot time (2.7778 μsec). When the transmission time of each cell is 20 nsec, the number of buses necessary for loading and saving the 512-word data is represented by 20 nsec×512 words×2/ 2.778 μsec (=7.37<8). Therefore, 8 buses are required. Since one bus has 24 bits, the number of signal lines is 24×8=192.

From the above situations, there are problems of difficulty of the assembly of signal pins in the EC-LSI circuit and difficulty of simultaneous switching of these signal pins. Therefore, by taking the number of memories and LSI circuits connected to the buses into account, it is difficult to realize the above configuration.

Next, descriptions will be given of configurations according to the present invention to resolve these problems, by referring to FIGS. 15 to 17.

Figures 15A, 15B:
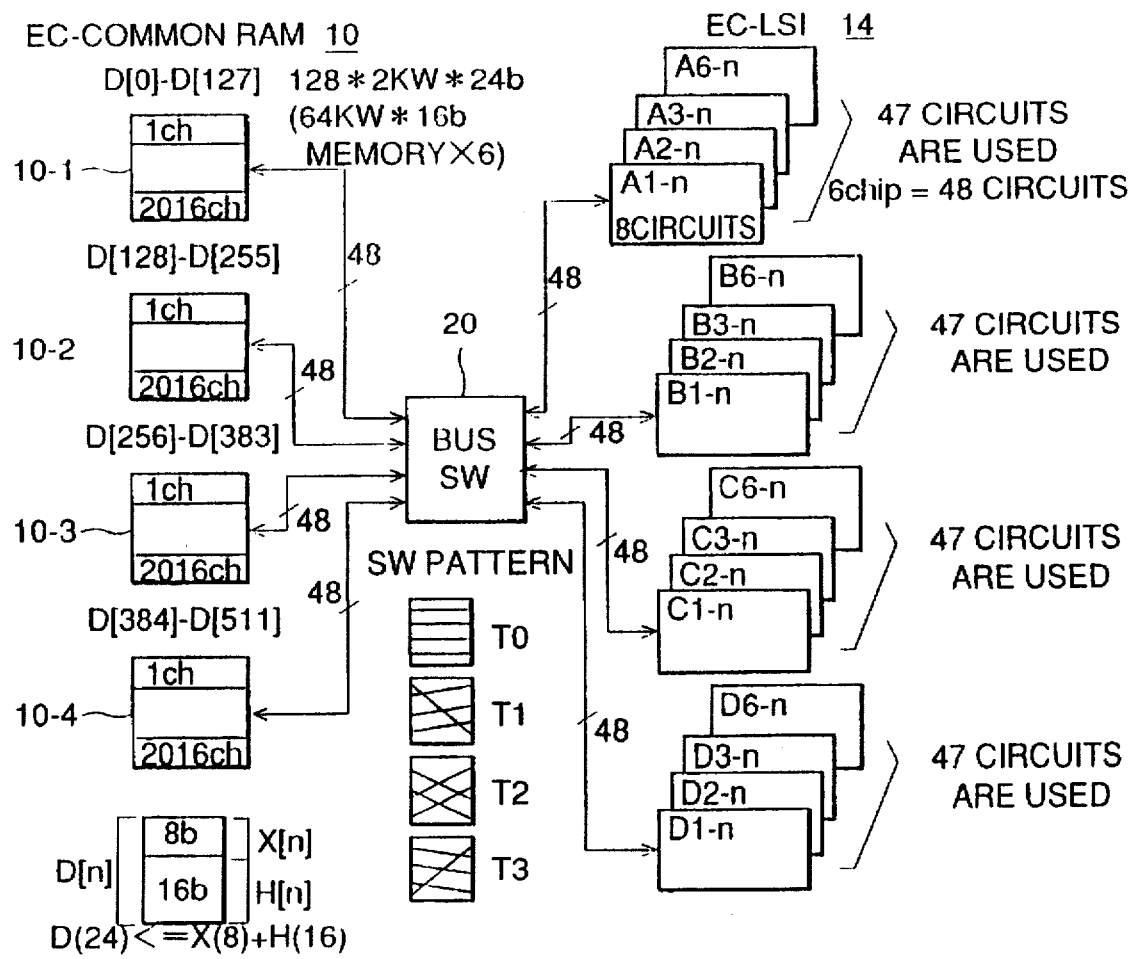
FIG. 15A shows a configuration of bus connections between an EC-common RAM and the EC-LSI circuits.
FIG. 15B shows a method of accessing the EC-common RAM by groups of the EC-LSI circuits shown in FIG. 15A.

FIG. 15A shows a configuration of bus connections between the EC-common RAM and the EC-LSI circuits. In FIG. 15A, the EC-common RAM 10 is constructed with 4 memory banks 10-1 to 10-4, each of which stores data of 128 words (1 word is 24 bits) for the 2016 channels. The first bank stores words $D[0]$ to $D[127]$ (a word is represented by $D[n]$), the second bank stores words $D[128]$ to $D[255]$, the third bank stores words $D[256]$ to $D[383]$, and the fourth bank stores words $D[384]$ to $D[511]$. The 24-bit word represented by $D[n]$ is constructed with the 8-bit speech data $X[n]$ and the 16-bit tap coefficient $H[n]$.

Since the number of ECUs 13 is 188 as shown in FIGS. 12 and 13, the number of the EC-LSI circuits 14 is also 188 which is a multiple of 4. Therefore, the EC-LSI circuits 14 are divided into 4 groups A to D. Each group includes 6 LSI chips, each of chips having 8 EC circuits (each EC circuit can perform the 12 multiprocessing). Accordingly, 48 EC circuits are located in each group, 47 of them actually being used (a total of 188 circuits).

The groups A to D respectively have the chips A1-n to A6-n, B1-n to B6-n, C1-n to C6-n, and D1-n to D6-n, where n represents the designation number 1 to 8 of the 8 EC-LSI circuits mounted in each chip. In FIG. 13, the representations A1-1, B1-1, C1-1, . . . , C6-7, D6-7 at the right-end side show each circuit in the groups A to D of the EC-LSI circuits shown in FIG. 15A.

In FIG. 15A, a bus switch (BUSSW) 20 is located in the center. By using the bus switch 20, the 4 banks of the EC-common RAM 10 can be simultaneously accessed from one of the groups of the EC-LSI circuits 14. Therefore, by switching the bus 4 times in the bus switch 20, the data of all 4 banks can be connected with all 4 groups of the EC-LSI circuits 14 to be accessed (load and save). To meet the above operation, between each of the banks 10-1 to 10-4 in the EC-common RAM 10 and the bus switch 20, and between the bus switch 20 and each of the groups A to D in the EC-LSI circuits 14, is a 48-bit (corresponding to 2 words) bus line.

FIG. 15B shows a method of accessing the EC-common RAM 10 by the groups of the EC-LSI circuits 14 shown in FIG. 15A. In FIG. 15B, in a time slot T0, the group A of the EC-LSI circuits 14 accesses the bank 1 (10-1) of the EC-common RAM 10, the group B the EC-LSI circuits 14 accesses the bank 2 (10-2) of the EC-common RAM 10, the group C of the EC-LSI circuits 14 accesses the bank 3 (10-3) of the EC-common RAM 10, and the group D of the EC-LSI circuits 14 accesses the bank 4 (10-4) of the EC-common RAM 10. In this time slot, the bus switch 20 is switched as shown in an SW pattern of T0 in FIG. 15A.

For the time slot T0, the groups simultaneously transmit the 128-word data of the allocated cellslot by 2 words through the 48-bit bus. Therefore, the 128-word data is transmitted in 64 cycles.

In a time slot T1, the bus switch 20 is switched as shown in an SW pattern of T1 in FIG. 15A. In the way shown in a T1 column of FIG. 15B, the groups of the EC-LSI circuits 14 access the 4 banks of the EC-common RAM 10 to transmit the data. After that, in time slots T2, T3, the bus switch 20 is switched as respectively shown in SW patterns of T2, T3 in FIG. 15A. Accordingly, each EC-LSI circuit 14 may access the 512-word data of each cell in a period T0 to T3. The bus switch 20 is switch-controlled in the way shown in FIG. 15B by a control section which is not shown in the drawings.

In the above method, each access time for the data increases to 4 times the access time necessary for the one group. However, since the data associated with the 4 EC units is accessed in the same period, the desired data transmission can be performed. Furthermore, since each width of the buses is reduced to ¼ (192/4=48 bits) the conventional width, the problem of the pins of the EC-LSI circuit 14 is resolved. Still further, by dividing the EC-LSI circuits 14 into the 4 groups, the number of the EC-LSI circuits 14 which are connected in the same bus may be reduced, so that the problem of the driving ability of the bus driver is also resolved.

Figures 16A, 16B:
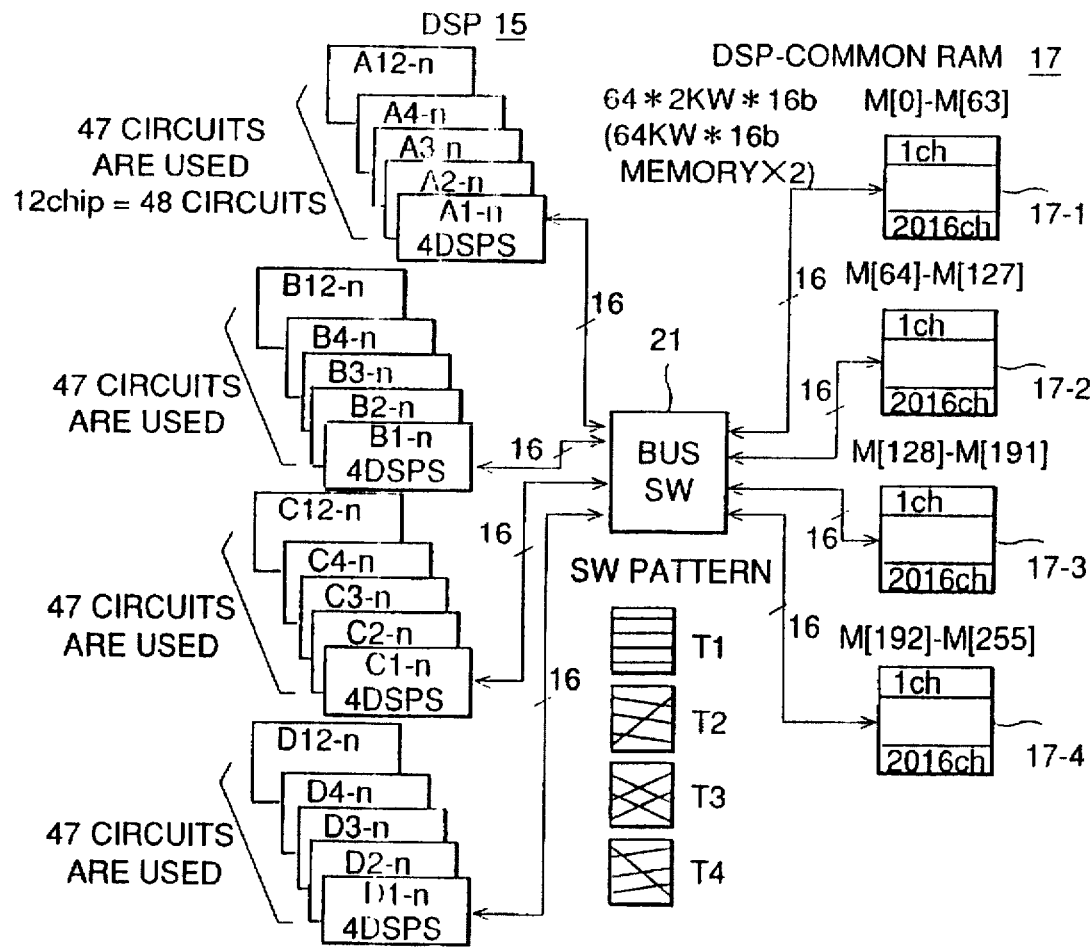
FIG. 16A shows a configuration of bus connections between a DSP-common RAM and the DSPs.
FIG. 16B shows a method of accessing the DSP-common RAM by groups of the DSPs shown in FIG. 16A.

FIG. 16A shows a configuration of bus connections between the DSP-common RAM 17 and the DSPs 15. In FIG. 16A, the bus connections between the DSP-common RAM 17 and the DSPs 15 are constructed in the same way as that shown in FIG. 15A. The DSP-common RAM 17 is constructed with the 4 memory banks 17-1 to 17-4, each of which stores data of 64 words (1 word is 1 6 bits) for the 2016 channels. The first bank stores words M[0] to M[63] words (the word is represented by M[n]), the second bank stores words M[64] to M[127], the third bank stores words M[128] to M[191], and the fourth bank stores words M[192] to M[255]. Accordingly, for each cellslot, the 256-word data is stored. The speech data is associated with the cells of a maximum of 2016 channels, and, thus there are idle slots in the 2115 cellslots.

In FIG. 16A, DSPs 15 are divided into 4 groups A to D. Each group includes 12 LSI chips, each of chips having 4 DSPs (each DSP can perform the 12 multiprocessing). Accordingly, 48 DSPs are located in each group, 47 of them actually being used (a total of 188 circuits).

The groups A to D respectively have the chips A1-n to A12-n, B1-n to B12-n, C1-n to C12-n, and D1-n to D12-n, where n represents the designation number 1 to 4 of the 4 DSPs 15 mounted in each chip.

In FIG. 16A, a bus switch (BUSSW) 21 is located in the center. By using the bus switch 21, the 4 banks of the DSP-common RAM 17 can be simultaneously accessed from one of the groups of the DSPs 15. Therefore, by switching the bus 4 times in the bus switch 21, the data of all 4 banks can be connected with all 4 groups of the DSPs 15 to be accessed (load and save). To meet the above operation, between each of the banks 17-1 to 17-4 in the DSP-common RAM 17 and the bus switch 21, and between the bus switch 21 and each of the groups A to D in the DSPs 15, is a 16-bit (corresponding to a single word) bus line.

FIG. 16B shows a method of accessing the DSP-common RAM 17 by the groups of the DSPs 15 shown in FIG. 16A. Based on the way shown in FIG. 16B and SW patterns of the bus switch 21 shown in FIG. 16A, the DSPs 15 simultaneously access the DSP-common RAM 17 through the 4 buses, and transmit the data by 16 bits through each bus.

FIG. 17 shows an illustration for explaining a relationship between the cellslot timings and memory-data transmission timings of each EC unit 13. These memory-data transmission timings are for both the memory accessing operation between the EC-LSI circuits 14 and the EC-common RAM 10 and the memory accessing operation between the DSPs 15 and the DSP-common RAM 17. For simplification of the description, the EC-common RAM 10 and the DSP-common RAM 17 will be called merely memories, and the EC-LSI circuits 14 and the DSPs 15 will be called merely circuits, hereinafter.

When the cellslots 1, 2, 3, . . . on the 155-Mbps transmission line in the ATM network are generated as shown in the top side of FIG. 17, the first 4 cells are allocated to the respective first circuits of the groups A to D shown in FIGS. 15A and 16A. Namely, the first cellslot is allocated to the circuit A1-1 of the group A, the second cellslot is allocated to the circuit B1-1 of the group B, the third cellslot is allocated to the circuit C1-1 of the group C, and the fourth cellslot is allocated to the circuit D1-1 of the group D. After that, in each group A to D, the cellslots are allocated to the circuits 1-1, 1-2, 1-3, . . . , in that order. When the cell is applied to the circuit, the data corresponding to the cellslot number is read out from the corresponding memory (this operation is represented by R), and after the speech data in the cell is processed, the processed data is written into the memory (this operation is represented by W).

An example of the operation timing of the first cellslot is shown in the bottom side of FIG. 17. When the first cellslot is applied to the circuit A1-1 of the group A, the data is read in a first 5.5-μsec period (Read). After that, the echo cancelling operations for the 47 samples are performed in the following 5111.1-μsec period. After the echo cancelling operations, the processed data (updated data) of the first cellslot is written into the memories in a next 5.5-μsec period (Write). As a result, the process of the first cellslot is finished. In succession, the circuit A1-1 is applied with the 189-th cellslot. Also for the 189-th cellslot, the corresponding data is read (Read), the echo cancelling operations for the 47 samples are performed, and the processed data is written into the memories (Write). Next, the processing of the 377-th cellslot starts. In this way, each circuit sequentially performs the multiprocessing of the echo cancelling.

In the accessing of the memories by the circuits, as shown in FIGS. 15A and 16A, the 4 banks of the memories are sequentially accessed in the time slots T0 to T3 by the switching of the bus switch 20 or 21. The circuits in the groups A to D respectively perform one of operations of reading (Read), writing (Write), writing after reading (Read/Write), and reading after writing (Write/Read) to and from the memories according to the process condition.

When 10-th cellslot on the transmission line shown in FIG. 17 is generated, the process condition in the time slot T0 shows that the circuit A1-3 of the group A reads the data from the memories (Read), the circuit B1-3 of the group B reads the data after writing (Write/Read), the circuit C1-3 of the group C writes the data (Write), and the circuit D1-3 of the group D writes the data after reading (Read/Write). In the following 12-th cellslot, the process condition shows that the circuit of the group A writes the data (Write), the circuit of the group B writes the data after reading (Read/Write), etc. In this way, as the time pasts, the operation of the memory access changes. In such a transmission timing in the memories, each circuit of the groups may perform the multiprocessing of the cellslots.

Figure 18:
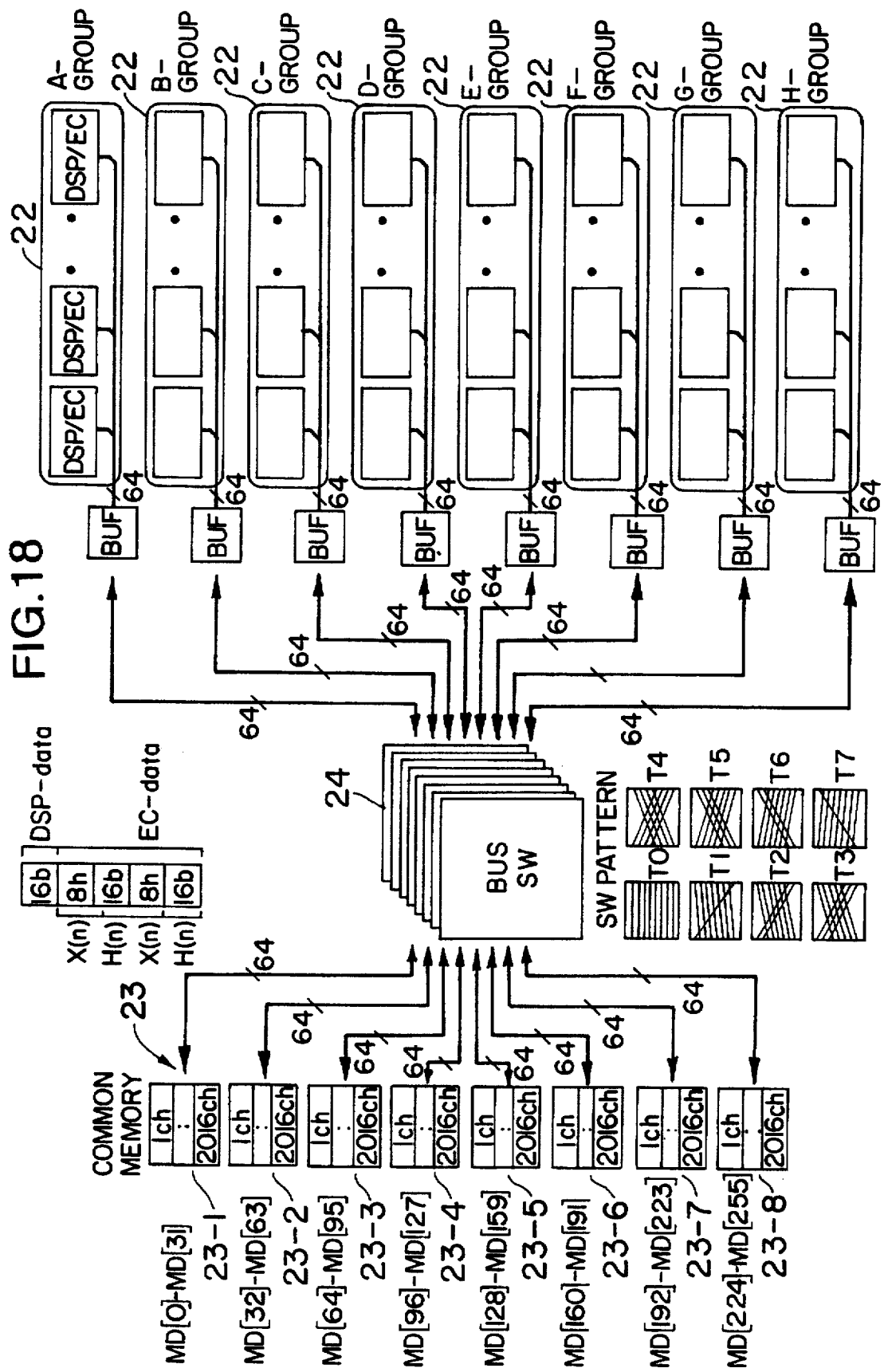
FIG. 18 shows a configuration of another embodiment of the echo canceller system.

FIG. 18 shows a configuration of another embodiment of the echo canceller system. The echo canceller system has a plurality of echo canceller units 22 and a single common memory 23. In each echo canceller unit 22, the DSP and the EC-LSI is integrated into 1 chip. Therefore, there is no need for two common memories for the DSP and the EC-LSI. FIG. 8 also shows a configuration of bus connections between the single common memory and the 1-chip-LSI echo canceller units. In the configuration, the common memory 23 is constructed with 8 banks 23-1 to 23-8, which are connected to A to H groups of the echo canceller units 22 through the bus switch 24. The bus switch 24 may form 8 kinds of paths T0 to T7 in switch pattern.

As described above, the present invention has the following features.

According to the echo canceller system, the processing ability of the echo canceller units can be improved. This leads to miniaturization of the hardware scale of the echo canceller system in the ATM networks.

Further, the cell can start to be processed as soon as the cell is applied to the system without the waiting time.

Since there is no waiting time for the processing of the hardware, the input buffer is unnecessary. Further, the delay time in the echo cancelling process may be minimized to only the processing time of the EC unit.

Therefore, extremely miniaturization of the hardware, reduction of the process delay, and fixing of the process delay are simultaneously realized.

Further, the present invention is not limited to these embodiments, but various variations and modifications may be made without departing from the scope of the present invention.

What is claimed is:

1. An echo canceller system for performing echo cancelling processing for a plurality of cells on a communication line, said system comprising:

a plurality of echo canceller units to which said cells applied to the echo canceller system are allocated according to an applied order of the cells regardless of channels of the cells.

2. The echo canceller system as claimed in claim 1, wherein said applied order of the cells is an order of cellslot numbers of the cells.

3. The echo canceller system as claimed in claim 2, wherein each of said echo canceller units has a multiprocessing function of processing the cells during a process interval of cells including speech data.

4. The echo canceller system as claimed in claim 3, wherein said system further comprises common storage means, connected to said echo canceller units through a bus, for storing data necessary for the echo cancelling processes for each channel providing a cell to be processed, and each of the echo canceller units detects the channel from a header of the cell and accesses the data for the channel from the common storage means.

5. The echo canceller system as claimed in claim 4, wherein said common storage means comprises:

a first common RAM storing tap data and tap coefficients for said each channel providing the cell to be processed; and a second common RAM storing data for updating the tap coefficients and controlling the data.

6. The echo canceller system as claimed in claim 5, wherein said echo canceller system further comprises:

a common input data line receiving said plurality of cells which includes cells from a transmission line and cells from an echo pass; and a common output data line producing echo-cancelling-processed cells.

7. The echo canceller system as claimed in claim 5, wherein each of said echo canceller units comprises:

an echo canceller circuit multiprocessing to generate a quasi-echo, calculate a remaining echo, and update the tap coefficients by accessing said first common RAM; and a digital signal processor multiprocessing to calculate update coefficients of the tap coefficients, detect a specified signal, and control said echo canceller circuit.

8. The echo canceller system as claimed in claim 7, wherein said echo canceller system further comprises:

a common bus connecting a plurality of said echo canceller circuits and a plurality of said digital signal processors in the echo canceller units; and a controller allocating a usable time of said common bus to said digital signal processors according to an input timing of the cell.

9. The echo canceller system as claimed in claim 8, wherein said controller allocates the usable time of said common bus to said digital signal processors and produces a body number of the digital signal processor to which the usable time of the common bus is presently allocated to the other digital signal processors, said controller allocating the usable time of said common bus to said digital signal processors in an order of body numbers of the digital signal processors, wherein each of the other digital signal processors recognizes a timing when the usable time of the common bus will be allocated to itself based on said body number produced by the controller.

10. The echo canceller system as claimed in claim 8, wherein said echo canceller system comprises a plurality of said common buses, and data is transmitted through the common buses.

11. The echo canceller system as claimed in claim 8, wherein said echo canceller system further comprises:

a first print board onto which said plurality of the echo canceller circuits and said first common RAM are mounted; and a second print board onto which said plurality of the digital signal processors and said second common RAM are mounted.

12. The echo canceller system as claimed in claim 3, wherein a number of said echo canceller units is determined by a number of cellslots generated on the communication line during the process interval of the cells including the speech data, and the cells in the cellslots are permanently allocated to the echo canceller units according to the cellslot numbers of the cells.

13. The echo canceller system as claimed in claim 3, wherein a number m of said echo canceller units is determined by n times a number of cellslots generated in the communication line during the process interval of the cells including the speech data, and the cells in the cellslots are permanently allocated to the specified echo canceller units each n times the process interval.

14. The echo canceller system as claimed in claim 5, wherein said first common RAM and said second common RAM respectively include i banks, i being an integer larger than 1, the echo canceller units accessing all data stored in the first common RAM and the second common RAM by accessing each bank.

15. The echo canceller system as claimed in claim 14, wherein said first common RAM and said second common RAM respectively store said all data for all the channels, the data to be stored in each channel being divided into i parts which are stored in the banks.

16. The echo canceller system as claimed in claim 14, wherein:

said echo canceller circuits are constructed with i groups of the circuits;

said digital signal processors are constructed with i groups of the processors;

said echo canceller system further comprises a first bus switch switching data buses between said i banks of the first common RAM and said i groups of the circuits, and a second bus switch switching data buses between said i banks of the second common RAM and said i groups of the processors; and each of said i groups of the circuits accesses all banks of the first common RAM by switching of the first bus switch, and each of said i groups of the processors accesses all banks of the second common RAM by switching of the second bus switch.

17. The echo canceller system as claimed in claim 2, wherein said cells are asynchronous transfer mode (ATM) cells transmitted in networks including ATM networks, and said order of cellslot numbers of the cells is an order of cellslot numbers of the ATM cells.

18. An echo canceller system for performing echo cancelling processing on a plurality of cells in a communication line, said system comprising:

a common input data line receiving said plurality of cells which includes cells from a transmission line and cells from an echo pass;

a common output data line producing echo-cancelling-processed cells;

a plurality of echo canceller units, each of said units having a multiprocessing function of processing the cells received from said common input data line during a process interval of cells including speech data, each of said echo canceller units being independent of channels of the cells and being capable of processing any channels of the cells; and common storage means, connected to said echo canceller units through a bus, for storing data necessary for the echo cancelling processing for each channel providing a cell to be processed;

wherein each of the echo canceller units detects a channel from a header of the cell and accesses the data for a channel from the common storage means.

19. The echo canceller system as claimed in claim 18, wherein said common storage means comprises:

a first common RAM storing tap data and tap coefficients for said each channel providing the cell to be processed; and a second common RAM storing data for updating the tap coefficients and controlling the data.

20. The echo canceller system as claimed in claim 19, wherein each of said echo canceller units comprises:

an echo canceller circuit multiprocessing to generate a quasi-echo, calculate a remaining echo, and update the tap coefficients by accessing said first common RAM; and a digital signal processor multiprocessing to calculate update coefficients of the tap coefficients, detect a specified signal, and control said echo canceller circuit.

21. The echo canceller system as claimed in claim 18, wherein said cells are asynchronous transfer mode (ATM) cells transmitted in networks including ATM networks.

22. An echo canceller system for performing echo cancelling processing for a plurality of cells on a communication line, said system comprising:

a plurality of echo canceller units to which said cells applied to the echo canceller system are allocated according to an applied order of the cells regardless of channels of the cells; and common storage means connected to said echo canceller units through a bus for each channel providing a cell to be processed and each echo canceller unit accesses data for the channel from said common storage means, wherein each of said echo canceller units comprises:

an echo canceller circuit for multiprocessing to generate a quasi-echo, calculate a remaining echo, and update tap coefficients for each channel providing the cell to be processed by accessing said common storage means, and a digital signal processor for multiprocessing to calculate update coefficients of the tap coefficients, detect a specified signal, and control said echo canceller circuit.

* * * * *